US010572539B2

(12) United States Patent
Noble

(10) Patent No.: US 10,572,539 B2
(45) Date of Patent: Feb. 25, 2020

(54) ECOSYSTEM-PATTERNED USER-CENTRIC INFORMATION AND INTERACTION NETWORK

(71) Applicant: Vladimir Cher Noble, Stevenson Ranch, CA (US)

(72) Inventor: Vladimir Cher Noble, Stevenson Ranch, CA (US)

(*) Notice: Subject to any disclaimer, the term of this patent is extended or adjusted under 35 U.S.C. 154(b) by 311 days.

(21) Appl. No.: 15/140,835

(22) Filed: Apr. 28, 2016

(65) Prior Publication Data

US 2016/0321377 A1 Nov. 3, 2016

Related U.S. Application Data

(60) Provisional application No. 62/155,473, filed on May 1, 2015.

(51) Int. Cl.
| | | |
|---|---|---|
| *G06F 16/90* | (2019.01) | |
| *G06F 16/901* | (2019.01) | |
| *G06Q 40/08* | (2012.01) | |
| *H04L 29/08* | (2006.01) | |

(52) U.S. Cl.
CPC ......... *G06F 16/9024* (2019.01); *G06Q 40/08* (2013.01); *H04L 67/18* (2013.01); *H04L 67/306* (2013.01)

(58) Field of Classification Search
CPC .......... G06F 17/30958; G06F 16/9024; G06Q 40/08; H04L 63/102; H04L 67/18; H04L 67/306
See application file for complete search history.

(56) References Cited

U.S. PATENT DOCUMENTS

| | | | | |
|---|---|---|---|---|
| 6,330,554 B1* | 12/2001 | Altschuler | ............. | G06Q 30/02 |
| | | | | 706/21 |
| 7,739,139 B2 | 6/2010 | Robertson et al. | | |
| 7,792,748 B1* | 9/2010 | Ebersole | ................ | G06Q 40/00 |
| | | | | 235/379 |
| 7,797,732 B2 | 9/2010 | Tam et al. | | |
| 7,800,616 B2* | 9/2010 | Said | ...................... | G06T 11/206 |
| | | | | 345/440 |

(Continued)

OTHER PUBLICATIONS

Estrada at al. Complex Networks as Hypergraphs. Complex Systems Research Group, University of Santiago de Compostela, Spain.

*Primary Examiner* — Alford W Kindred
*Assistant Examiner* — Tiffany Thuy Bui

(57) ABSTRACT

A system comprises one or more computing systems. The computing systems provide access to one or more data stores that store a plurality of data objects and data hypergraphs. The plurality of data objects and data hypergraphs includes a plurality of interconnected and overlapping user digital econiches that each is owned by a respective user. A user digital econiche corresponds to a plurality of components of a respective user ecological and information environment and to associations and interactions among components. A user digital econiche includes a first set of user nodes, a second set of ecosystem entity nodes, a third set of interaction agent nodes, a first set of intra hyperedges, and a second set of inter hyperedges. A hyperedge connects any number of nodes. An intra hyperedge connects nodes accessible by one user only. An inter hyperedge connects at least one node accessible by more than one user.

12 Claims, 8 Drawing Sheets

(56) References Cited

U.S. PATENT DOCUMENTS

| | | | |
|---|---|---|---|
| 8,032,508 B2 | 10/2011 | Martinez et al. | |
| 8,244,848 B1 * | 8/2012 | Narayanan | G06Q 50/01 709/218 |
| 8,667,064 B2 | 3/2014 | Zuckerberg et al. | |
| 8,744,929 B2 | 6/2014 | Besos et al. | |
| 8,768,332 B2 | 7/2014 | Swanburg | |
| 8,887,155 B2 | 11/2014 | Gokul | |
| 8,942,986 B2 | 1/2015 | Cheyer et al. | |
| 8,954,441 B1 * | 2/2015 | Baranov | G06F 17/30958 707/739 |
| 8,954,864 B1 | 2/2015 | Thakkar et al. | |
| 9,015,167 B1 | 4/2015 | Ballou et al. | |
| 9,043,464 B1 | 5/2015 | Trainor et al. | |
| 9,319,479 B2 | 4/2016 | Canning et al. | |
| 9,363,135 B1 * | 6/2016 | Merom | H04L 29/08072 |
| 2003/0014421 A1 * | 1/2003 | Jung | G06F 17/30917 |
| 2008/0161941 A1 * | 7/2008 | Strassner | G06Q 10/04 700/29 |
| 2008/0271022 A1 * | 10/2008 | Strassner | H04L 41/0873 718/100 |
| 2008/0320001 A1 * | 12/2008 | Gaddam | G06Q 10/10 |
| 2010/0063993 A1 * | 3/2010 | Higgins | G06Q 10/10 709/203 |
| 2010/0185642 A1 * | 7/2010 | Higgins | G06F 17/30867 707/758 |
| 2010/0332316 A1 * | 12/2010 | Chaiken | G06Q 30/02 705/14.46 |
| 2014/0025660 A1 * | 1/2014 | Mohammed | G06F 17/30554 707/722 |
| 2014/0229618 A1 | 8/2014 | Kumar et al. | |
| 2014/0379487 A1 | 12/2014 | Ta | |
| 2015/0089401 A1 | 3/2015 | Ta | |
| 2015/0334117 A1 | 11/2015 | Terleski | |
| 2015/0347480 A1 * | 12/2015 | Smart | G06F 17/30327 707/743 |
| 2016/0012152 A1 * | 1/2016 | Johnson | G06F 17/30958 707/798 |
| 2016/0063086 A1 | 3/2016 | Candelore | |
| 2016/0112366 A1 | 4/2016 | Olen et al. | |
| 2016/0117322 A1 * | 4/2016 | Ramaswamy | G06F 17/30958 707/756 |
| 2017/0221240 A1 * | 8/2017 | Stetson | G06T 11/206 |

* cited by examiner

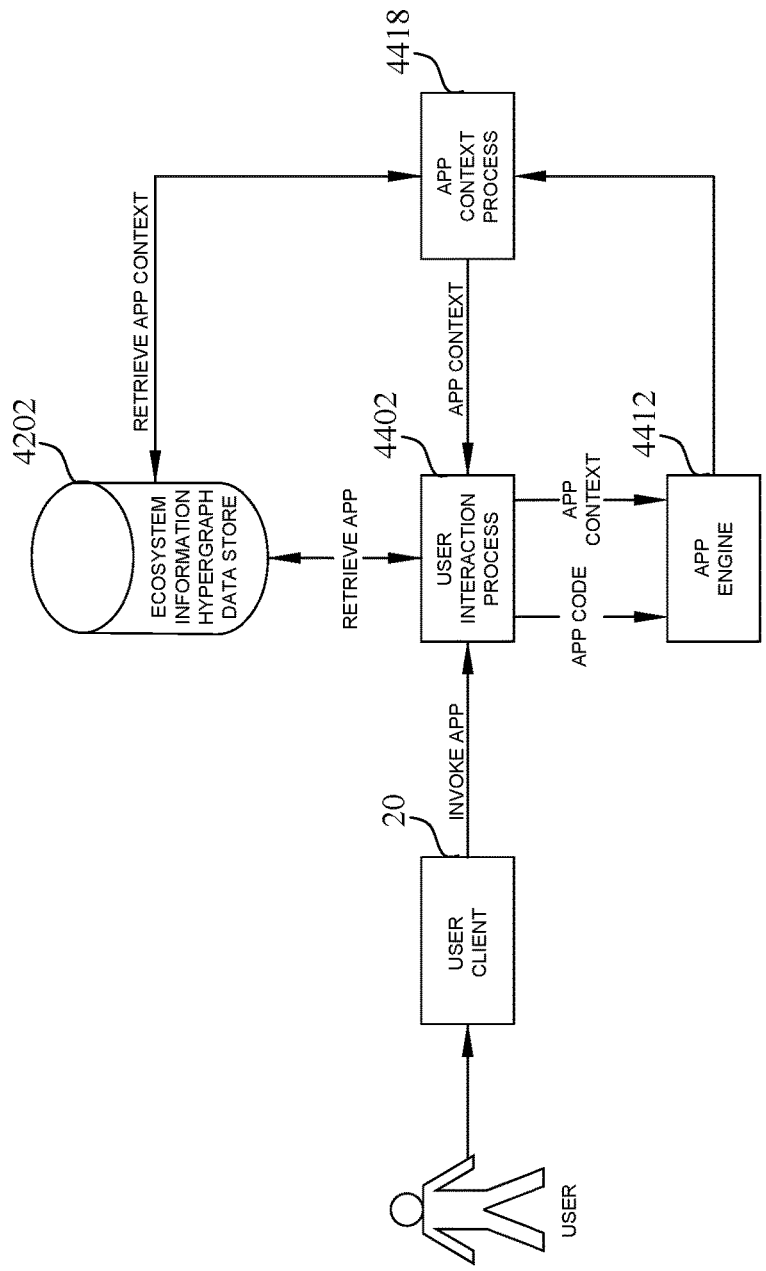
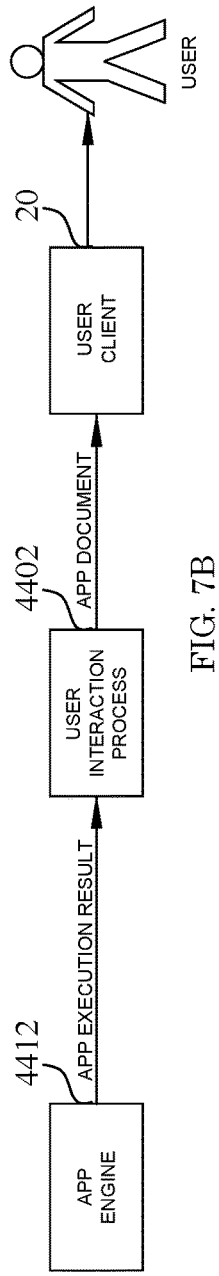
FIG. 7A
FIG. 7B

ECOSYSTEM-PATTERNED USER-CENTRIC INFORMATION AND INTERACTION NETWORK

CLAIM OF BENEFIT

This application claims the benefit of U.S. provisional patent application 62/155,473 entitled "Digital Ecosystem Environment for Information Organization, Discovery, Acquisition, and Collaboration" filed on May 1, 2015. The contents of application 62/155,473 are hereby incorporated by reference.

BACKGROUND

In order to survive and prosper in a human ecosystem that is in a state of perpetual change, human operators (individuals, groups, organizations, etc.) need access to contemporaneous information describing current and prior states of their ecosystem components and ecosystem as a whole. They also need the ability to find and share information necessary to interact with components of their ecological and information environment, and to cooperate, collaborate, and compete among themselves.

In their activities, human operators use disparate computing systems as platforms. Each platform implements narrowly focused information models of the human ecosystem. The platforms can be deployed over a plurality of computing systems interconnected through an array of local and wide area networks including private networks and the Internet. Conventional approaches to facilitate human operators' activities and interactions include a plurality of platforms and applications that each support a specific area or a specific class of activities. By way of example, social networks are used for social interactions, eCommerce platforms for selling and buying goods, Web sites for publishing product information, etc. Proliferation of these platforms force the user to create multiple disjoint digital identities and leads to user information space fragmentation. It also generates vast amounts of information that overruns human capabilities for information management. Rapid advent of Internet of Things (IoT) and proliferation of electronic agents that control technologically enabled and connected Things further increase the number of interaction platforms. It exacerbates the problem by offering a plurality of apps that create walled-off islands of information. Hence, there is a need to develop integrated platforms to facilitate human operator activities.

Information search represents an important part of human operator's activities. To facilitate the search, an industry of search providers (Google, Microsoft, Yahoo, and others) developed a plurality of search engines. Existing search engines provide user searching for information with a plurality of possible matching information hits related to a user request. Several approaches are in use to improve accuracy of search and help the user in selecting a best match. Google and others use sophisticated ranking algorithms. Local search services employ geographic location of the user to find nearby businesses and services. The amount of hits being delivered by these search engines still overloads the user by requiring him to select needed information from a vast plurality of options. In addition, human operators have a growing volume of private or personal information that they do not make available to search engine providers. Therefore, there is a need to develop new information search environments and methods to improve search accuracy and reduce an amount of hits presented to a user.

SUMMARY

Provided are systems and methods for managing user interactions with other users and with ecosystem components of user ecological and information environment. The system gives each user access to information and knowledge needed by a particular user to execute interactions that he is involved in. The disclosed systems and methods allow a user to create a plurality of information environments that each is tailored by the user to accommodate the user specific knowledge and information needs regarding a particular interaction.

In each interaction, a user needs specific knowledge, experience, skills, and information about the current state of the user ecological environment. Depending on the knowledge, experience, and skill level, different users may have different information needs in similar interactions. By way of example, a plumber may not need additional knowledge and information to replace a leaking faucet. But a user that does not have plumbing skills may need information about reliable plumbers in his area. Yet another user may choose to replace the faucet himself. This user may need a phone number of Home Depot plumbing department and an instruction video showing how to replace the faucet.

As used herein, plurality of ecosystem components of user ecological and information environment is referred to as user econiche. Plurality of ecosystem components of a user econiche includes the user, one or more non-human ecosystem components, and may include one or more other users. To facilitate interactions, users may employ various programmable tools that augment human mind.

In the present disclosure, user econiche is modelled by the user digital econiche. User digital econiche is an information model of a respective user econiche. Disclosed systems and methods provide a user with means to build his own user digital econiche. User's digital econiche allows the user to access respective knowledge and information needed by the user to execute respective interactions with ecosystem components of his econiche.

Some of human ecosystem components may belong to two or more user econiches. These user econiches are interconnected and overlap each other. By way of example, users may employ a Scheduler Application to schedule a meeting of busy participants. The participants may allow Scheduler Application to access their calendars, to choose a few options of a time when all participants are available for the meeting, to inform participants, get their feedback, and determine an option that is acceptable to everybody. Provided systems and methods represent a platform for ecosystem-patterned user-centric interaction and information network of interconnected and overlapping user digital econiches.

BRIEF DESCRIPTION OF THE DRAWINGS

FIG. 7A illustrates an example data flow in an example application invocation in an example interaction network.

FIG. 7B illustrates an example data flow in an example application execution in an example interaction network.

DESCRIPTION OF EXAMPLE EMBODIMENTS

Figure 1A:
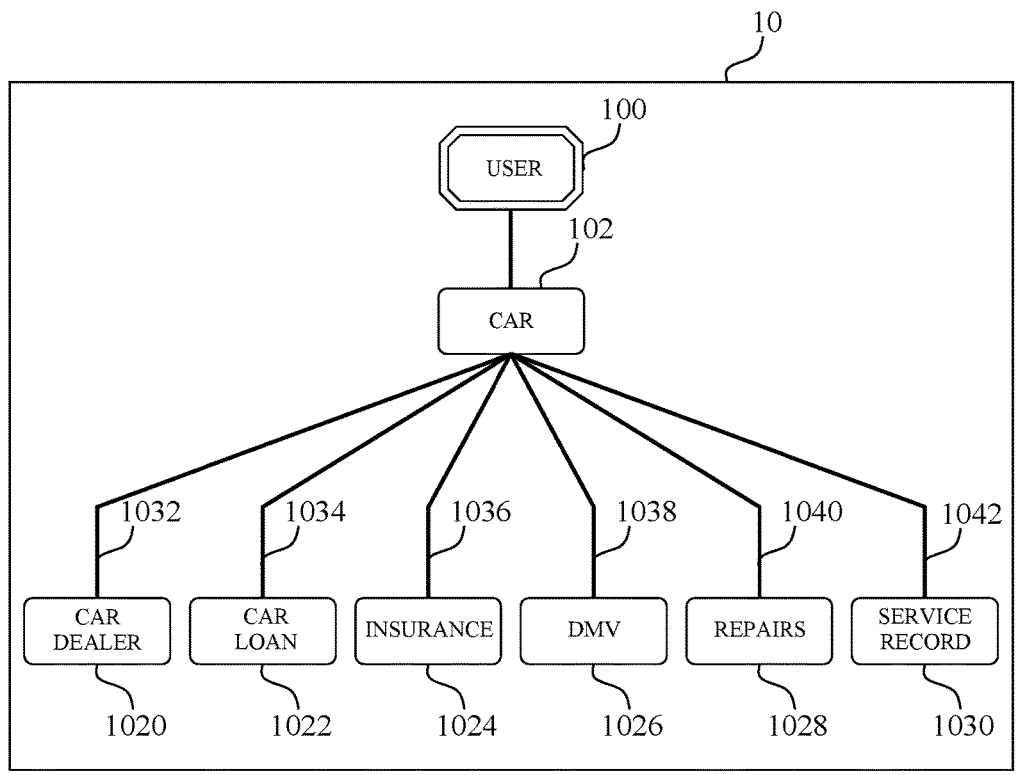
FIG. 1A illustrates an example structure and layout of an example associative twine (hyperedge) from an example user digital econiche hypergraph.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. For simplicity, ecosystem-patterned user-centric information and interaction network is referred to herein as interaction network.

In the present disclosure, "or" may imply "and," as well as "or." It means "or" does not necessarily preclude "and," unless explicitly stated or implicitly implied. Throughout the present disclosure, the terms "a" and "an" are intended to denote at least one of a particular element. As used herein, the terms "includes" and "comprises" mean includes and comprises but not limited to; the terms "including" and "comprising" mean including and comprising but not limited to.

Embodiments of the interaction network use a plurality of interconnected computing systems as a platform. Platform combines hardware and software means that may be located in one place or distributed in various locations.

As used herein, human ecosystem, or simply ecosystem, includes a plurality of human operators that interact among themselves and with a plurality of ecosystem entities that are non-human. Human operators and ecosystem entities are referred to herein as ecosystem components. Ecosystem entities belong to natural, social, built, and knowledge and information environments. Natural, social, and built environments are referred to herein as an ecological environment. Knowledge and information environment, or simply, information environment, by way of example, may include a know-how, how-to and other guides, a manual, instruction, review, regulation, a book, article, patent, and other ecosystem entities that contain knowledge and information pertinent to various user activities. For simplicity, ecosystem entities from the information environment are referred to herein as information entities. Information entities are a part of a database of human experience and knowledge.

As used herein, a user is a human operator registered with an interaction network. In the present disclosure, a user interacts with other users and with ecosystem entities in confines of the user econiche. User econiche is a part of the ecosystem. User econiche includes a user, a plurality of other users that the user interacts with, and a sub plurality of ecosystem entities that the users from the user econiche interact with.

In particular embodiments, users, in their interactions, may utilize programmable tools that are referred to herein as interaction agents. An interaction agent represents a programmable extension of the human mind and is capable of executing instructions to help users interact with their ecological and information environments. As used herein, an interaction agent belongs to ecosystem components.

In the present disclosure, an interaction network may be described in terms of ecosystem hypergraph. Ecosystem hypergraph includes nodes and hyperedges. Each node of the ecosystem hypergraph contains information corresponding to a respective ecosystem component. Interactions within ecosystem as a whole and within a user digital econiche may include two or more ecosystem components. Ecosystem hyperedge connects two or more nodes corresponding to the ecosystem components involved in a respective interaction. Ecosystem hyperedge contains knowledge and/or information needed by a user or a group of users to execute respective interaction that they are involved in.

As used herein, a user may be an individual, an organization (business, enterprise, government entity, etc.), or a group of individuals and organizations. In some embodiments, the interaction network may serve unregistered human operators. A user may be a male, female, business, organization, etc. For simplicity, any user is referred to herein as "he."

Ecosystem entities may include tangible animate and inanimate physical objects, chemical substances, intangible creations of human intelligence, and information entities from a database of human experience and knowledge. Tangible physical objects can be observed, sensed, or otherwise detected by humans either directly using five human senses or indirectly with help of special tools that extend human senses range and capabilities, like microscopes, telescopes, ultrasound devices, drones, etc. By way of example, tangible physical interaction objects may represent user's house, appliances, cars, pets, real estate owned by the user or managed by him; water resources, city air and infrastructure monitored and managed by city manager; public lands managed by federal government, etc. Intangible creations of human intelligence, by way of example, may correspond to a project, drawing, design, service, bank or credit card account, audio and/or video entity, etc.

Interaction agents include software programs and machines that can be monitored, controlled and authorized by user to make changes to an ecological or informational environment, organize and maintain information, or execute applications on behalf of or in a service of a user. Interaction agent may be an intelligent agent, a software agent, an intelligent personal assistant, a desktop or mobile application, a computer program, and the like.

In the present disclosure, interaction is defined as a process that involves a user or an interaction agent and at least one other user or ecosystem entity of any kind. Interaction results in either altering the state of one or more users or ecosystem entities, their connections, or acquisition of new information and knowledge by one or more users. Relationship between two or more users and ecosystem entities may be based on functional, social, categorical, domestic, proprietorial, informational, and other types of relationships.

In particular embodiments, each user, each ecosystem entity, and each interaction agent may be modeled, described, or represented by one or more information models that each pertain to a particular relationship or a particular interaction that the respective ecosystem component is involved in or is a part of. Each user, each ecosystem entity, and each interaction agent may be represented by different information models in different relationships or interactions. Each information model of a user, an ecosystem entity, or an interaction agent describes or defines a respective functional role in, or adaptation to a respective relationship or interaction between respective users, ecosystem entities, and interaction agents. Each information model of an ecosystem component comprises a collection of one or more information items that are referred to herein as content attributes. Each content attribute has an identifier and a value and describes or represents a corresponding particular feature, or property, of an ecosystem component. By way of example, a content attribute as a part of an individual's information model may represent user address and phone number, another content attribute may represent user login credentials, yet another one may represent user age, gender, and list of medications, etc. A content attribute of a product may represent a brand, name, price, technical specifications, user reviews, and the like. Content attributes of ecosystem component information models provide information needed for users and interaction agents to interact with ecosystem entities and to communicate and collaborate among themselves.

Furthermore, in particular embodiments, each relationship or interaction between users, ecosystem entities, and interaction agents may be defined, described, or represented by corresponding information model as well. Information models of this type include content attributes that provide users and interaction agents with information needed to establish a respective relationship or to facilitate or enable a respective interaction.

In the present disclosure, information model of a user econiche comprises a plurality of information models of (i) ecosystem components from the user econiche, (ii) a plurality of defined by the user associative relationships among the components, and (iii) a plurality of interactions among them. Information model of a user econiche is referred to herein as the user digital econiche. Each user is the owner of his digital econiche. In particular embodiments, econiches of different users and, as a result, user digital econiches, are interconnected and may overlap.

In the present disclosure, user digital econiche is described in terms of a user digital econiche hypergraph. Ecosystem hypergraph as a whole comprises a plurality of interconnected and overlapping user digital econiche hypergraphs. User digital econiche hypergraph contains information that is referred to herein as a user data hypergraph. In particular embodiments, each node of a user digital econiche hypergraph corresponds to a respective information model (i) of the owner, or (ii) of a user interacting with the owner, or (iii) of an ecosystem entity or an interaction agent from the user econiche. Hyperedges of a user digital econiche hypergraph connect two or more nodes. Each hyperedge defines an associative relationship or enables interaction between users, interaction agents, and ecosystem entities from a user digital econiche. For simplicity, hyperedges are referred to herein as twines, and ecosystem entity nodes as entity nodes. As used herein, a twine that connects a pair of nodes is referred to herein as an edge.

In particular embodiments, a one or more computing systems that collectively implement an interaction network provide a user with means to create a user digital econiche. In some embodiments, the means may include a graphical user interface, a text interface, and other interfaces. Graphical interfaces allow a user to interact with the computing systems to create a graphical layout of a user digital econiche. In some embodiments, graphical layout may have a hierarchical structure to provide user with capability of navigating among layout icons to find respective nodes and twines. Text interfaces allow user to create and edit text information models. Other interfaces may support photo, video, audio, etc. information models. The computing systems also allow a user to access information contained in the respective nodes and twines to support, facilitate, and enable interactions that the user is involved in.

In the present disclosure, the one or more computing systems are capable of providing access to one or more data stores that store a plurality of data objects and data hypergraphs. The plurality of data objects and data hypergraphs comprises a plurality of interconnected and overlapping user digital econiches. Each user digital econiche is owned by a respective user and corresponds to a plurality of ecosystem components from the respective user ecological and information environments, and to a plurality of relationships and interactions among ecosystem components of a respective user econiche.

In present disclosure, each user digital econiche comprises a plurality of nodes and a plurality of twines. Each node from the plurality of nodes corresponds to a respective ecosystem component from the user digital econiche and can be of one of one or more node types. The plurality of node types includes a first set of user nodes that each corresponds to a respective user digital econiche owner or a user interacting with the owner, and a second set of ecosystem entity nodes that each is accessible by an owner of a respective user digital econiche and defines a respective user need for information regarding respective functional role of a respective ecosystem entity in one or more respective interactions involving the respective ecosystem entity. The plurality of node types further includes a third set of interaction agent nodes that each corresponds to a respective interaction agent. An interaction agent is a proxy software agent capable of executing instructions or creating nodes on behalf of a respective user or another interaction agent. User digital econiche further comprises a plurality of twines that each defines a connection between nodes from the plurality of nodes. Plurality of twines from a user digital econiche comprises two sets of twines. Each twine from the first set of intra twines connects at least two nodes from the plurality of nodes, wherein all ecosystem entity nodes and interaction agent nodes connected by an intra twine are accessible by a user digital econiche owner only. Each intra twine defines a respective digital econiche owner associative relationship or enables interaction between at least one of the user and interaction agent with one or more ecosystem entities connected by a respective intra hyperedge. Each twine of the second set of inter twines connects at least two nodes from the plurality of nodes, wherein at least one node connected by an inter twine belongs to at least two different digital econiches. An inter twine enables interaction between respective user digital econiches that each contains at least one of the nodes connected by a respective inter hyperedge.

By way of example, FIG. 1A illustrates an example structure and layout (graphical interface) of an example twine from an example user digital econiche hypergraph. User digital econiche is owned by user 100. The twine describes process of acquiring and maintaining car ownership. When a user buys a car, he may create twine 10 to help him manage tasks related to car ownership. Twine 10 connects user node 100 together with car entity node 102, car dealer user node 1020, car loan entity node 1022, car insurance entity node 1024, DMV user node 1026, car repair record entity node 1028, and car service record entity node 1030. By clicking or otherwise selecting one of the twine icons in the twine layout, the user may open a file that contains respective information. By way of example, by clicking the icon 1028 user may open a file containing car repair records. The records may be entered in the file by respective car dealers or car repair shops after each repair. In some embodiments, by clicking on an icon user may receive one or more links that may lead to the required information directly or to other links that may lead to the information in several steps. By way of example, by clicking the icon 1026, the user may open a link to DMV online service like car registration renewal, etc. Twine 10 reflects user's associations related to the car node 102. Another user may have different associations related to car ownership and may create different twine 10. By way of example, user may have more than one car and interact with more than one dealer and a few repair shops. Yet another user may like to change oil himself and may include a node that contains a link to a youtube.com video with related instructions. Associations of each user reflect respective user need for information related to a respective interaction. In the present disclosure, twines that define associations between nodes and/or twines based on the user information needs and user-defined organizational scheme are referred to herein as "associative twines." Associative twines may have a hierarchical structure to help user navigate and traverse plurality of nodes and twines of the hypergraph.

A hypergraph change may lead to creation, deletion, or modification of nodes, edges, and twines. Nodes representing users or interaction agents that have, or are granted and acquired one or more management rights to make the hypergraph changes as a result of a particular interaction are referred to herein as dominant nodes in respective interactions. Nodes representing users and ecosystem entities that are not allowed to make ecosystem information hypergraph changes in particular interactions are referred to herein as subordinate nodes in respective interactions.

Each user and each interaction agent may be represented by a dominant node in some interactions at a given moment in time and by a subordinate node at another moment in time or in another interaction. By way of example, Mr. Smith may be a doctor, or an engineer, or a CEO of a company, etc. In these social roles Mr. Smith may be represented by a dominant node. The same Mr. Smith as a client of the company that he controls, or as a patient, or as a borrower, etc. may be represented by a subordinate node. In some interactions, Mr. Smith as a user may create a business card type node that contains information about mail address, phone number, email address, and the like. Mr. Smith enters and updates this information by himself and plays a dominant role with regard to the business card node. Mr. Smith may use this node in many different interactions with other users. If Mr. Smith changes his address or phone number, he updates respective information in his business card node. All users that use this node in their interactions with Mr. Smith immediately receive updated information. The same Mr. Smith, as a patient, may create a medical history node. This node information may be entered or changed by Mr. Smith doctors only. With regard to his medical history node Mr. Smith plays a subordinate role. As a user, Mr. Smith may be represented in ecosystem hypergraph by one or more entity nodes. Each of these nodes defines a respective role, a function, or an adaptation of Mr. Smith to respective relationships and interactions. By way of example, an application may be represented by a dominant node with regard to data objects it works on, and by a subordinate node with regard to the application developer or a buyer of the application.

In the present disclosure, each node connected by a twine represents one of one or more models of a respective user, interaction agent, or ecosystem entity. Each user, each interaction agent, and each ecosystem entity connected by a twine may be represented in the twine by one or more respective nodes/models that are pertinent or adapted to the respective twine. By way of example, models of users and interaction agents represented in a twine may depend on whether the respective user or interaction agent is represented by a dominant or a subordinate node in interaction defined by the respective twine. Each user or interaction agent may be represented in a relationship or an interaction by one or more dominant and one or more subordinate node. For example, a twine that defines Mr. Smith interaction with his doctor may connect, among others, the following nodes: Mr. Smith business card, Mr. Smith medical history, Mr. Smith medical insurance, doctor's business card, and test laboratory. In this twine, Mr. Smith is represented by two dominant nodes (business card and medical insurance) and one subordinate node (medical history).

In the present disclosure, a collection of twines from the plurality of twines may also be a part of, or connected by, a higher hierarchical level twine. By way of example, one or more pair of nodes connected by edges may be a part of or connected by a higher hierarchical level twine. A twine that is connected to or by one or more other twines is referred to herein as a hypernode. Hypernode represents a sub twine that is a part of or being nested in a higher hierarchical level twine. By way of example, in FIG. 1A a hypernode includes a car node 102 and a car dealer node 1020 connected by an edge 1032. In the nested twine structure, higher hierarchical level twine is referred to herein as a "parent" twine with regard to one hierarchical step lower "child" twine. By way of example, if a user or an ecosystem entity is represented in a twine by more than one node (model), the respective nodes comprise a sub twine, or a hypernode, of the twine. In the example above, Mr. Smith is represented in his interactions with a doctor by three nodes: business card, medical insurance, and medical history. These nodes are connected by a sub twine that defines their connection with Mr. Smith. Mr. Smith may use the same three nodes in twines that connect him with other doctors. Thus, these three nodes connected by a sub twine may be a part of one or more twines and, as such, constitute a hypernode.

Furthermore, each node, hypernode, and twine may be represented or described by a collection of attributes. Collection of attributes includes a first set of content attributes of a respective information model represented by a respective node, hypernode, or twine and a second set of network attributes. Node network attributes may include a node ID, user digital econiche ID, a name or a label, node type, list of twines containing the node, content file type, list of users having administrative and management rights over the node or parts of the node, tags, creation timestamp, updated timestamp, current state identifier, etc. Node type may define whether a node represents a user, an interaction agent, a physical object, an intangible object, an application, a remote device, or any other suitable type. Node tags are used for node information discovery and retrieval. They may represent a set of meta data tags including ontological and other descriptors, searchable queries, and the like. If a node contains a file or a reference link to a file, the file type attribute specifies its format, like PDF, TXT, JPEG, etc. If a node represents a user, more attributes may be added like user name and type (individual, business, organization, family, etc.). If a node is an application, the attributes may include executable file or a link to it, name or ID of the developer, revision, list of nodes or files needed to run the application, and other suitable information. If a node represents a remote device or Internet of Things component, node attributes may include IDs of users utilizing the device, device type and sub type, application (or application ID) needed for the users of interaction network to communicate with the remote device, communications schedule, ID of a node storing data provided by the remote device, and any other suitable or relevant information. In some embodiments, application that is needed for users to communicate or control a remote device may be represented by a separate respective interaction agent node. In particular embodiments, other attributes may be added to facilitate management, discovery, acquisition, competition, cooperation, and collaboration of related specific nodes. Nodes representing different models of the same user or ecosystem entity may have different collections of attributes with some attributes being common to two or more respective nodes.

Collection of twine attributes may include twine type, sub type, parent twine, list of nodes connected by the twine, list of child twines, description, list of users having administrative and management rights over the twine, timestamp, tags (meta data) including searchable queries, ontological and other descriptors, and other suitable or relevant information depending on the twine type and type of associative relationship or interaction between nodes the twine connects. By way of example, if a twine is an edge connecting a pair of nodes or hypernodes, edge type may depend on type of nodes it connects. Nodes from possible pair combinations from plurality of nodes including user nodes, interaction agent nodes, ecosystem entity nodes, and hypernodes may be connected by an edge of a respective edge type.

Node or twine attribute may be represented by an URL specifying location of the attribute content. URL links may also be embedded into node or twine attributes. Attribute content may reside either in interaction network itself or in external sources, including World Wide Web, personal or business internal data repositories.

In a particular embodiment, a node and/or a twine hosted, at least in part, by one or more computing systems, may be changed as a result of interaction between users and components of their ecological and informational environment. Interaction network generates a timestamp related to the change of a respective node and respective twine and stores respective node and twine history in a relating storage. New and previous node and twine states may be saved separately and may be included in a special twine depicting node and twine timeline.

In particular embodiments, the one or more computing ecosystems provide a user with a managerial status over one or more nodes, hypernodes, and twines. The managerial status comprises four management rights. A first management right allows a user to acquire a managerial status over created by the user nodes, hypernodes, and hyperedges. A second management right allows a user to transfer the user managerial status over one or more nodes, hypernodes, and hyperedges under the user management to one or more other users for a specified or unspecified length of time and under specified or unspecified conditions. A third management right allows a user to delete, use, read, observe, and hear textual, visual, aural and other types of content provided by nodes, hypernodes, and twines under the user management, and fully or partially alter any nodes, hypernodes, and hyperedges under the user management. The third management right also allows a user to activate and instruct interaction agents under the user management. A fourth management right allows a user to share a right to use or to use and alter one or more nodes, hypernodes, and hyperedges under the user management with one or more other users or interaction agents for a specified or unspecified length of time and under specified or unspecified conditions.

A user that has managerial status over a node, hypernode, or a twine is referred to herein as a manager that manages the respective node, hypernode, or twine. As a manager, user may create or delete nodes and twines manually. Manager may also allow other users or interaction agents to create, delete, edit or modify nodes and twines under his management on his behalf.

Figure 2:
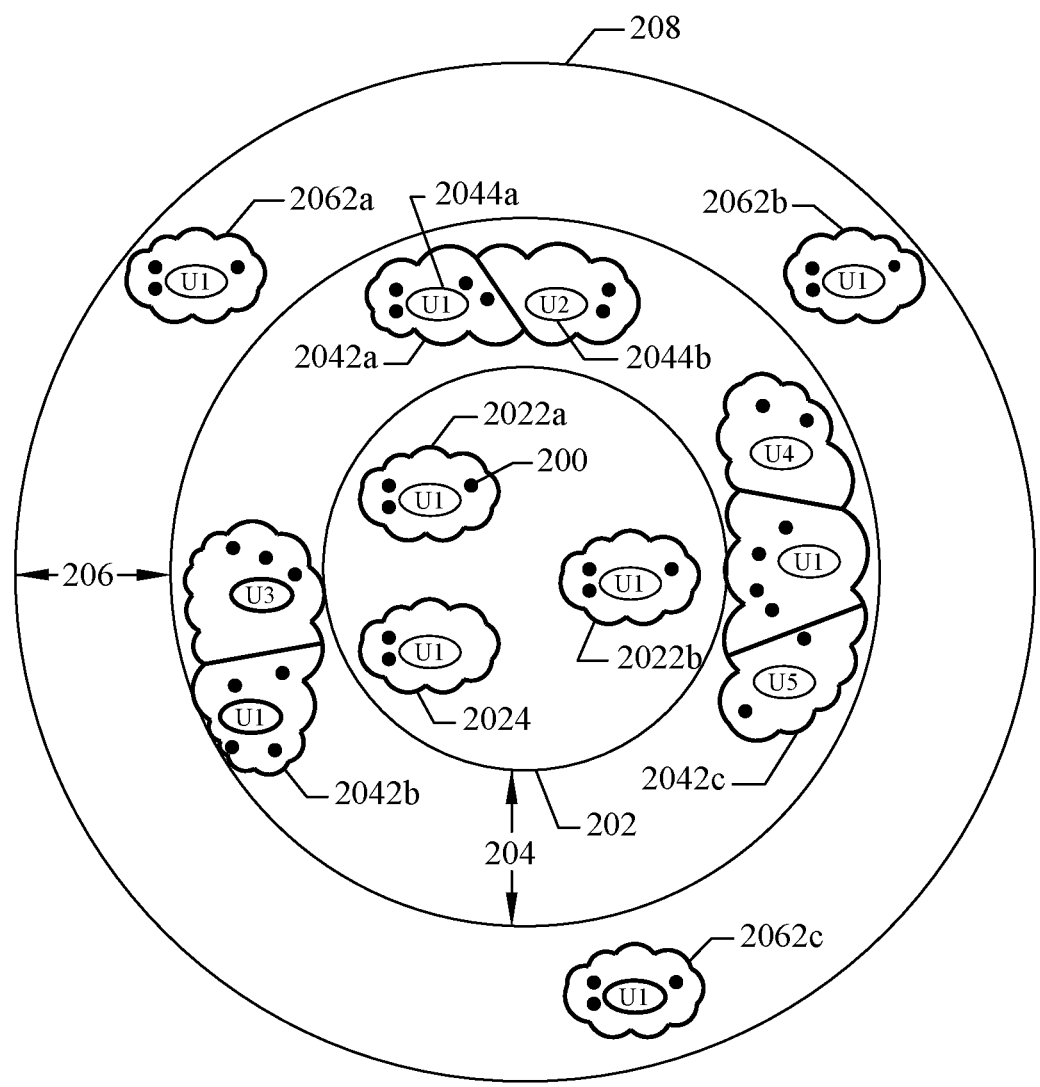
FIG. 2 illustrates an example user digital econiche in an example interaction network.

In particular embodiments, user digital econiches may have a set of common features. An example of a digital econiche of user U1 is illustrated in FIG. 2, where twines are shown as "clouds". Users are shown as ovals marked by user name. Each oval corresponds to one or more models (user node or hypernode) of the respective user. Each black dot inside a cloud depicts an entity node corresponding to ecosystem entity, a hypernode, an interaction agent, or a child twine that is connected by the respective twine. Each entity node, hypernode, and interaction agent node may be tailored, or adapted, to the respective twine. The same user or the same ecosystem entity may be represented by different models/entity nodes/hypernodes in different twines.

In particular embodiments, each user may manage one or more entity nodes and twines that he does not want to share with other users in any way. These nodes and twines are referred to herein as private. Pluralities of private nodes and twines comprise user private digital econiche, or user intraniche. By way of example, individual's private entity nodes and twines may represent user's diary, finished or unfinished books, articles, projects, private photos, and the like. Business private entity nodes and twines may represent departments, employees, and their relationships and interactions enabled by Intranet. User intraniche 202 of an individual as a user U1 is illustrated in FIG. 2. Private twines from user intraniche are referred to herein as intratwines. Intratwines 2022*a* and 2022*b* include user node/hypernode U1 and three private entity nodes/hypernodes 200 each. Intratwine 2024 includes user node/hypernode U1 and two private entity nodes/hypernodes. User may mark his private entity nodes and intratwines by a special tag that forbids node and intratwine discovery by other users.

In the present disclosure, user may grant one or more management rights over nodes and twines to one or more other users. If one of the users acquires granted rights over a node or a twine, or over one or more attribute of a node or a twine, the respective node or twine will be referred to herein as a shared, or a collaborative node or twine. Users that share one or more nodes and twines with other users are referred to herein as being in a cooperative or collaborative relationship with respective users. The respective nodes and twines are referred to herein as being of a collaborative type. The pluralities of a user collaborative nodes and twines comprise user collaborative digital econiche, or interniche, of the respective user. Collaborative twines from user interniche are referred to herein as intertwines. FIG. 2 illustrates an example user interniche 204 of the respective user U1. User U1 is represented by a user node/hypernode U1 in intertwines 2042*a*, 2042*b*, and 2042*c*. One or more user nodes/hypernodes in each intertwine may represent other users. Intertwine 2042*a* is formed by merging twine 2044*a* where all nodes are managed by user U1 and twine 2044*b* where all nodes are managed by user U2. User U1 shares management rights over one or more nodes in intertwine 2042a with user U2. Intertwine 2042b is formed by merging twines managed by users U1 and U3. Intertwine 2042c is formed by merging twines managed by users U1, U4, and U5. In each intertwine user U1 shares one or more management rights over one or more nodes with one or more other users. Again, user models in nodes/hypernodes U1 from different intertwines may be the same or different, adapted to a respective intertwine. In particular embodiments, manager may share management rights with other users on attribute level either over all attributes of a node/twine, or just over one or more attributes of the respective node/twine. For example, user may share a node name and content attributes, but not the list of other users collaborating on the respective node/twine. Similarly, collaborating user may be given a right to read both name and description, and a right to modify the content attributes only. Furthermore, a node/twine may have several similar attributes, like, for example, several content attributes. Node/twine manager may share some content attributes with some users, and other content attributes with other users. In particular embodiments, node and twine attributes may include ID's or names of respective node or twine manager or managers, a list of users sharing management rights to the respective node/twine and lists of attributes shared by each user.

User may need to advertise or in any other way expose his goods, products, or services; may want or need assistance on various tasks or projects; may look for potential clients and customers, or otherwise being interested in any way in cooperation, collaboration, or communication with other users. In particular embodiments, user may create and publish one or more corresponding twines that express user interest in external interaction in general and provide necessary details or specifics, and publish or place the twines 2062a, 2062b, and 2062c in external domain 206. External domain is referred to herein as user digital extraniche, and twines from user digital extraniche as extratwines. User may limit access to his digital extraniche nodes and extratwines to a specific class of users or allow access to any user. While competing with others, user may need to provide his potential buyers, customers, clients, or collaborators with information that has to convince them to buy products, use services or otherwise enter in cooperative or collaborative relationship. The information may include advertisements, specifications, pictures, videos, short descriptions, main features, reviews, discounts, coupons, and the like. User as a publisher may provide this information as an extratwine containing one or more nodes and/or other twines. Other users, or public, may receive an invitation or search and discover extratwines to which they have been granted access. If interested, one or more users that had discovered one or more extratwines may acquire them on conditions that may be specified in a dedicated node in the respective extratwine or in the extratwine attributes. If acquirer establishes a collaborative relationship with the publisher, he may create a new collaborative twine in his interniche and place into it the whole published extratwine or its sub twine including publisher user node/hypernode. Acquirer may create his own nodes in his new intertwine or adapt it to his digital econiche is any way he sees it fit. After acquisition, the publisher may create a new related intertwine in his interniche and include acquirer user node/hypernode into it. Publisher may create or tailor a respective intertwine for each acquirer. As an alternative, publisher may place new acquirer user node/hypernode into existing intertwines. Interaction network adds timestamps when nodes and twines are created or modified.

The plurality of all nodes and twines that user manages and/or shares with other users comprise the corresponding user digital econiche 208 that combines intraniche, interniche, and extraniche.

In particular embodiments, each user node/hypernode U1 from the respective user digital econiche 208 may be adapted to a twine that it's a part of. Private user nodes/hypernodes U1 may differ from collaborative user nodes/hypernodes U1 and from user nodes/hypernodes U1 in user extraniche. It means that user nodes/hypernodes U1$i$, $i$=1, 2, . . . , n (where n is a number of different nodes U1) may vary across plurality of twines in the user digital econiche. By way of example, user may share his business card type information with collaborating users, like his address and phone number with a Restaurant Takeout Application. In addition to this information, the same user may share age, gender, list of medications, allergies, and the like with his doctor. Various user nodes/hypernodes U1$i$ representing user U1 may have one or more common attributes and one or more attributes specific to the host twine. By way of example, all U1$i$ nodes may have a common attribute defining user name. In some embodiments, user may be represented by a node with a collection of attributes and allow collaborating users to share management rights over some attributes, and not over others.

Furthermore, user, as a human operator, may create more than one digital econiche, each digital econiche representing respective social role of the respective user. For example, small business owner may have one digital econiche to manage his personal and family activities and properties like house, cars, health, finances, insurance, etc., and another digital econiche to manage his business. Each user may have one or more user nodes representing one or more user models, each model being tailored to one or more respective user's digital econiche and one or more respective twine, each twine being a part of or included in respective user digital econiche. In some embodiments, user may create different login/authentication data specific to respective user digital econiche.

In particular embodiments, each node and each twine is stored, stored with, or may identify a corresponding webpage, mobile application, or other types of interconnected content documents hosted, at least in part, by one or more computing systems.

User models and models of components of user digital econiche, as well as relationships and interactions between nodes, change in time. In particular embodiments, interaction network may help users to control and manage these dynamic changes by keeping track of them. Each change in a node or a twine information may generate a new node or a new twine with a time stamp and an edge connecting the previous state of related node or twine and a new one representing the node or twine timeline. The changes may be entered manually or automatically.

In the present disclosure, a node/hypernode may be a part of or included in two or more twines. Such node is referred to herein as a "hub node". Similarly, a twine may be included as a sub twine in two or more twines. Such twine is referred to herein as a "hub twine". By way of example, user node may be of a hub type with regard to twines under his management and to collaborative twines where he is a part of or included in. By way of example, twine 10 in FIG. 1A is organized around hub car node 102. Along with user node 100, car node 102 is part of hypernodes, or sub twines 100-102-1020, 100-102-1022, 100-102-1024, 100-102-1026, 100-102-1028, and 100-102-1030.

In particular embodiments, a twine may comprise one or more sub twines (hypernodes) and/or one or more edges, each edge connecting a pair of nodes from a plurality of nodes connected by relating twine or sub twine. By way of example, in FIG. 1A, twine 10 includes pairs of nodes that are connected by relating edges 1032, 1034, 1036, 1038, 1040, and 1042.

Figure 3:
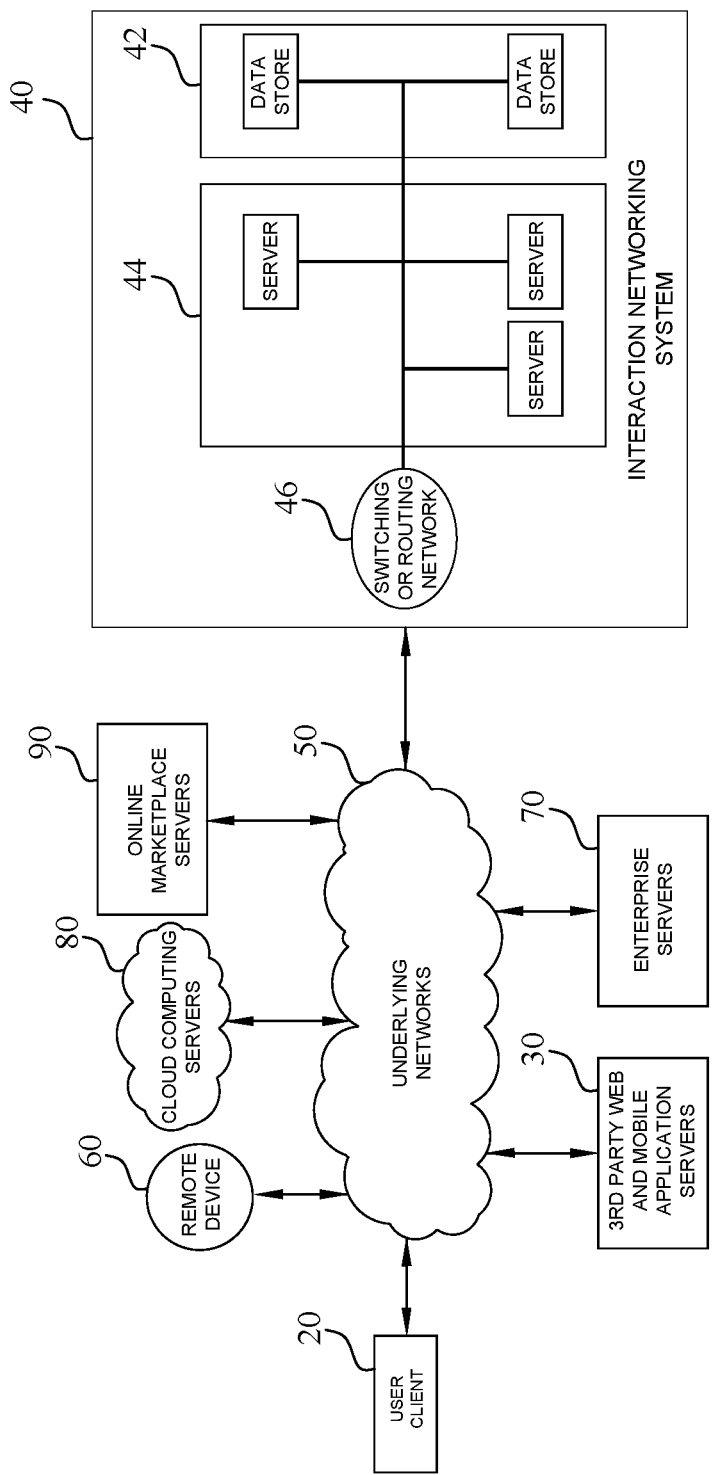
FIG. 3 illustrates an example structure of an example interaction network.

FIG. 3 illustrates an example architecture of an example interaction system that enables various interaction network embodiments. Example embodiments represent a computing network that is built on top of existing infrastructure of underlying interconnected networks 50. Underlying networks 50 may comprise packet-based wide area networks (like Internet), local area networks, wired, wireless and satellite networks, private networks, cellular networks, etc.

In example embodiments, user at user client device 20 operates with the interaction network in a client-server model with interaction networking system 40 on the server side. In particular embodiments, interaction networking system 40 comprises networked computing systems that allow user at a user client device 20 create user digital econiche, create, manage, and delete nodes and twines, discover, acquire, and organize information, use node and twine information in user activities, build and run applications, provide applications with relevant context, and communicate, cooperate, collaborate and compete with other users.

Interaction network may contain one or more remote devices 60 as clients of the interaction networking system 40. Each remote device 60 may be managed by one or more users and interact with device managers and one or more other users. By way of example, a remote device may be a house air conditioning thermostat, a "smart" kitchen appliance, a car self-driving and monitoring system, a robot on an assembly line, etc. As shown in FIG. 3, in particular embodiments, interaction networking system 40 comprises one or more networked computing systems that allow users of client devices 20 to communicate with each other, with remote devices 60, and with interaction networking system 40. In various embodiments, the interaction networking system 40 comprises a plurality of physical servers 44 interconnected and connected to a plurality of data stores 42. Servers of interaction networking system 40 are connected to underlying networks 50 and to data stores 42 by switching, routing or other addressable network 46. In some embodiments, one or more third party web and mobile applications servers 30, one or more enterprise servers 70, one or more cloud computing servers and data stores 80, and one or more servers supporting online marketplace 90 are included.

User client devices 20, remote devices 60, servers 30, 70, 80, and 90 may be a computing device or a computing system with ability to remotely communicate over a computer network with interaction networking system 40. They may utilize services of a network provider, a cloud provider, a wireless or wired provider, a set of networking switches, a set of packet-based routers, etc. to get a connection to underlying networks 50 and interaction networking system 40.

User client device 20 may be thick or thin. Thick client device 20 may be a workstation, a desktop PC, a laptop, a tablet, etc. It relies on local storage and local CPU. Thick client may support various graphic user interfaces (GUI), including Single Document Interface (SDI), Multiple Document Interface (MDI), and Tabbed document Interface (TDI) that are based on a WIMP device (window, icon, menu, pointing device), allowing the client to run a web browser like Firefox, Internet Explorer, Google Chrome, Safari, Opera, and the like.

Thin client device 20 may be a smartphone or PDA. It may use post-WIMP GUI of Android or Apple's iPhone. Smartphone and PDA may be connected to Internet via cellular network or Wi-Fi. They may run wireless Internet browsers (mobile browsers) like Android browser, iPhone Safari, Opera Mini and Opera Mobile, Chrome, and the like, and/or mobile applications. Third party web and mobile application servers 30 may support server side of web, mobile web, and mobile applications.

In particular embodiments, user client device 20 may comprise structured document rendering engine or suitable client application capable of providing user interface to present user with various types of content and layouts.

User at client device 20 may request a resource from the web and mobile application servers 30, enterprise servers 70, cloud servers 80, online marketplace servers 90, and from interaction networking system 40. User can specify the resource location by using ID of a node or a twine, Uniform Resource Identifier (URI), Uniform Resource Locator (URL) or other means to identify and locate the resource. The resource may be an HTML document, a PDF file, an image, or some other type of content.

In particular embodiments, user sends a request to interaction networking system 40 for a resource hosted by interaction networking system 40 and/or a resource hosted by servers 30, 70, 80 or 90. The request is generated by corresponding client side 20 application. Request contains data needed by the server side 30, 70, 80, 90, and 40 to locate the document and provide user with a document structure suitable for client device 20 rendering engine, including user ID, node or twine ID, document's URI/URL and meta data, Get or Post request method, type of user device and user rendering engine, types of content client can handle (text, image, etc.), device operating system, and timestamp.

Figure 4:
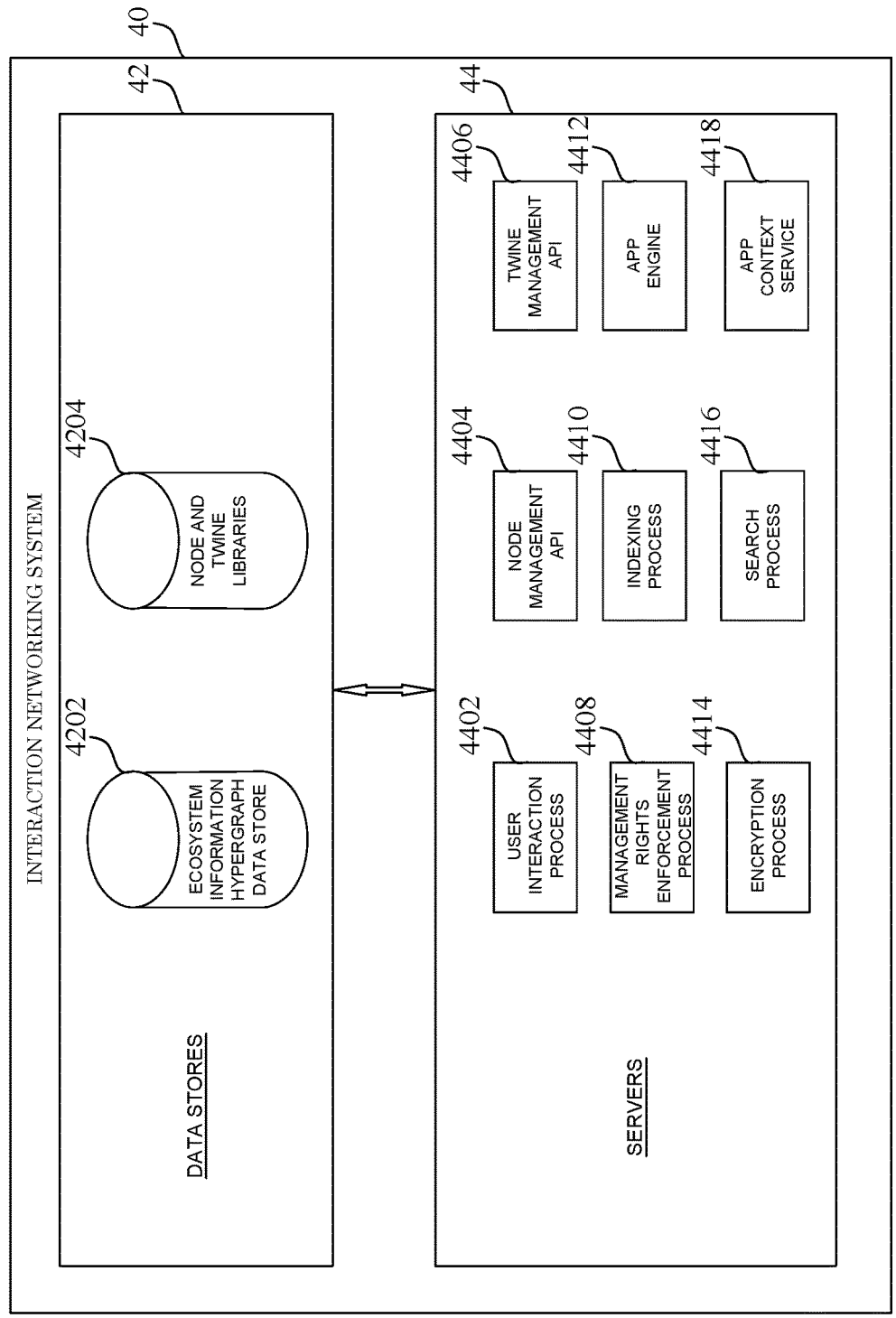
FIG. 4 illustrates an example architecture of an example interaction networking system

FIG. 4 illustrates an example architecture of an example interaction networking system. When a user sends a request for a document, user interaction process 4402 of an interaction networking system 40 checks whether the document is hosted by one of the data stores 42. If this is the case, user interaction process 4402 uses respective data from the data stores 42 and generates requested document. The document is presented to the user client 20 in a format required by its rendering engine. In some embodiments, rendering engine may use a format of markup language HTML 4.01 or earlier versions for thick clients and HTML.5 for smartphones and PDAs. The user interaction process 4402 transmits document using one of the transfer protocols like HTTP, FTP, or other similar protocols. In particular embodiments, user is required to login in order to get access to interaction network resources. Networking system 40 checks user's ID and password. If authentication is successful, interaction networking system 40 presents user with a homepage.

The servers 44 may include web and mobile applications servers, contain web pages and applications, and host APIs, processes, services, and engines implementing functions of interaction networking system 40. Web pages and applications may be implemented using CGI (Common Gateway Interface) platform, HTML4, HTML5 and XML languages, server side scripting languages ASP (Active Server Pages), Perl, PHP (Hypertext Preprocessor), ColdFusion, WebDNA, JavaScript, AJAX (Asynchronous JavaScript and XML), and the like.

In example embodiments, data stores 42 may store a plurality of interconnected and overlapping data hypergraphs that each contains information and software applications pertinent to a respective user digital econiche. Furthermore, data stores 42 may also store a library of various templates 4204 that interaction networking system 40 may provide users with in the process of creating and modifying user digital econiches, nodes, hypernodes, and twines. Data stores 42 may also store flat files that can store data and virtual machines. Data stores 42 may be implemented by one or more servers, storage area networks, data store clouds, data warehouses, and the like.

Figure 5A:
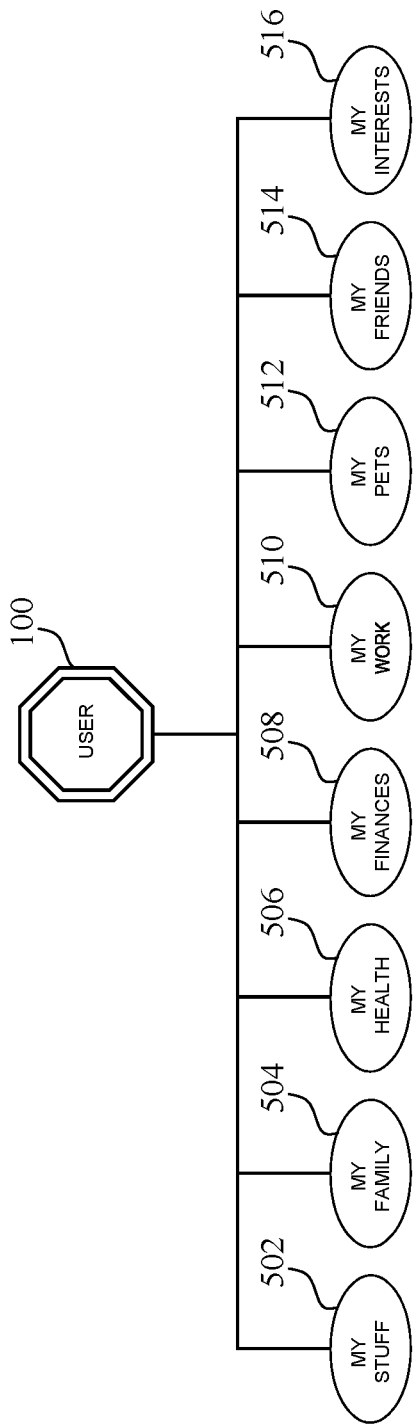
FIG. 5A illustrates an example template of an example user digital econiche in an example interaction network.

FIG. 5A illustrates an example template of an example user digital econiche in an example interaction network. In the example, interaction networking system 40 provides user 100 with means to access his information categories labeled as stuff data 502, family data 504, and information regarding health 508, finances 510, work 512, pets 514, friends 516, and interests 518.

Figure 6A:
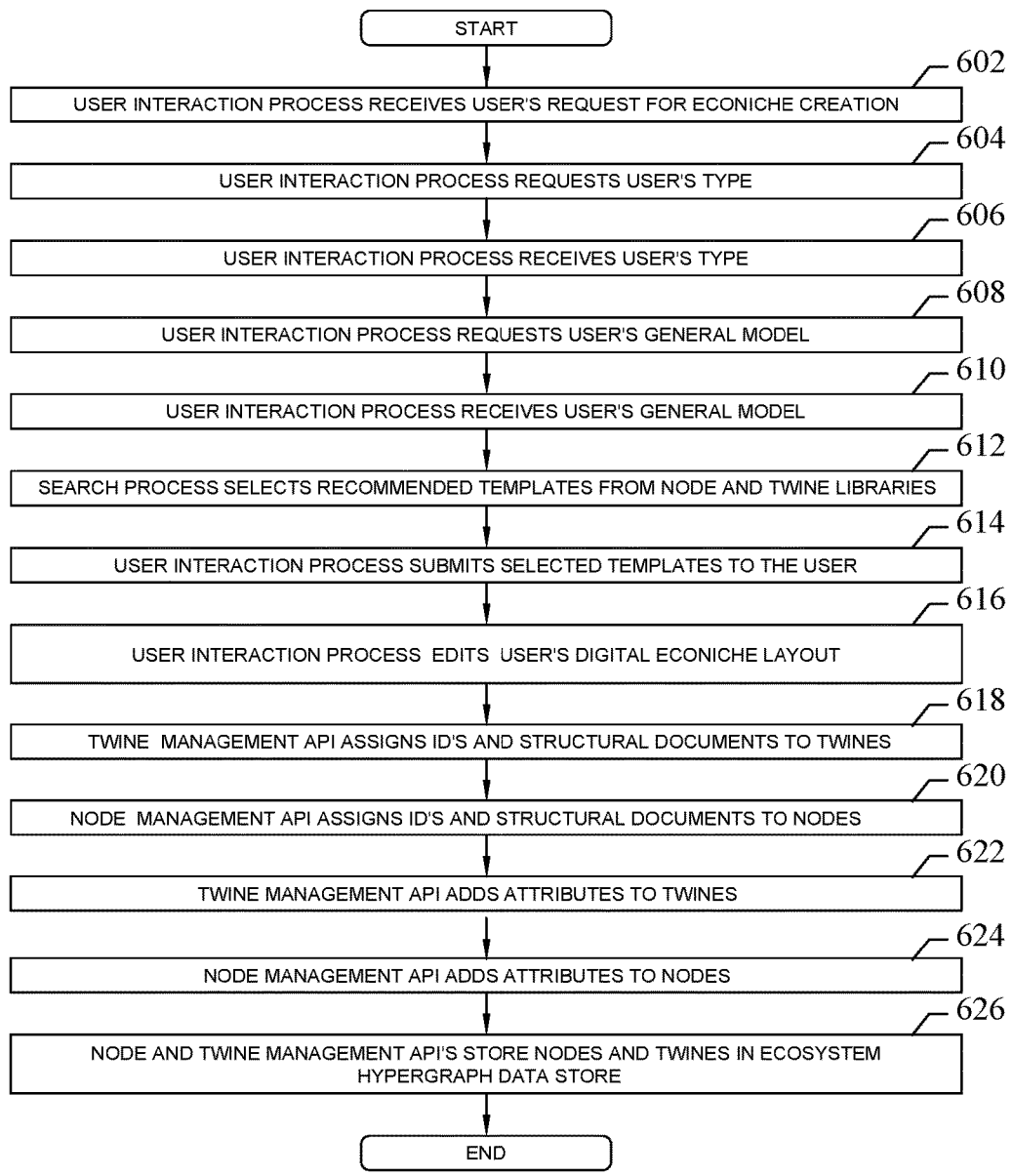
FIG. 6A illustrates an example process of creating an example user digital econiche in an example interaction network.
Figure 6B:
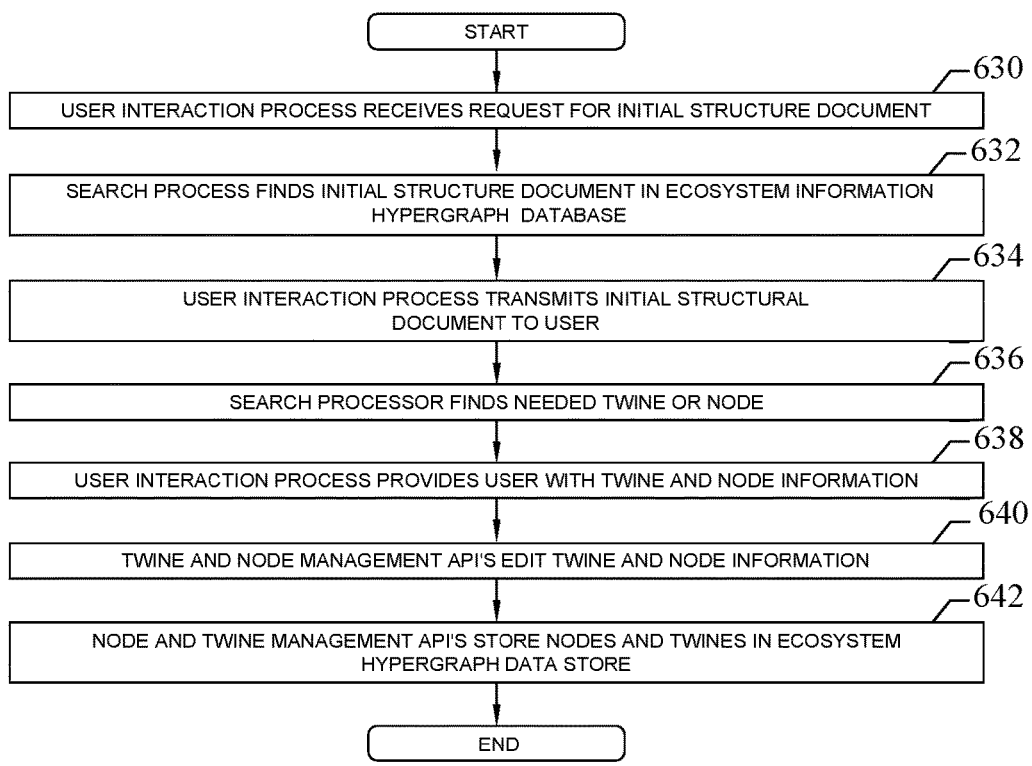
FIG. 6B illustrates an example process of using and modifying an example user digital econiche in an example interaction network.

In particular embodiments, after a successful user login, user interaction process 4402 of the interaction networking system 40 provides a user with a choice to use or edit/modify existing user digital econiche or to create a new one. FIG. 6A illustrates an example process of creating an example user digital econiche in an example interaction network. Together with FIG. 6B it is used herein to describe functions of interaction networking system 40. If a user decides to create a new econiche, he sends a respective request to the user interaction process 4402 that the latter receives in step 602. In response, the user interaction process 4402 transmits a request for the user's type in step 604. Request 604 may contain a user type template that lists known up to date user types. In step 606 the user interaction process 4402 receives information about user's type (an individual, a business, a sub type of business, an organization, a sub type of organization, etc.). Depending on the user type and subtype, the user interaction process 4402 sends a request for a user general model 608 to the user. Request 608 may contain a user general model template tailored to the user's type. General model template may be specific for each user type. For example, individual's general model may include data regarding address, age, sex, education, occupation, family, possessions user wants to manage, interests, etc. Businesses and organizations may have general model templates specific to their sub types. In step 610 the user interaction process 4402 receives user's general model, calls search process 4416 and transfers to it user's general model data. Search process 4416 executes search 612 of twine libraries 4204 of the interaction networking system 40 for a set of recommendation templates for the user's initial structural document (layout) for the respective user digital econiche corresponding to the respective user general model. The user interaction process 4402 transmits the set of selected templates 614 to the user. Each template represents an upper hierarchical level associative twine popular with users that have general models similar to the user. User may choose a particular template from the set.

While creating and editing visual or audio presentations (layouts) of pages, twines, and nodes in user's digital econiche in step 616, the user interaction process 4402 communicates with the user. User may rename labels, add or remove categories and labels, or otherwise edit or modify the accepted template. User may also reject the template completely and build his homepage based on user's associations from scratch. User interaction process 4402 provides user with tools needed to build and edit or modify a homepage and other pages. The tools may include text editor with capabilities to insert hyperlinks, as well as means to build graphic user interface supporting WIMP and post-WIMP technologies with components like windows, menus, radio buttons, check boxes, icons, avatars, etc. The graphic (visual) user interface may be augmented with audio interface including voice commands, special sounds, and the like. In some embodiments, user interaction process 4402 may also support audio interface for visually impaired users.

In the present disclosure, user has freedom to categorize, combine, and label the data and information he has to manage in a way that helps him to find needed data using his own associations that are specific to user's mind, user information needs, and user's perception of his econiche. By way of example, neighbors Bob and Jerry are golf buddies. Bob always meets Jerry with a smile. Jerry puts Bob's data in his "Friends" category. Bob, a real estate broker, puts Jerry in a "Prospective Clients" category.

Figure 5B:
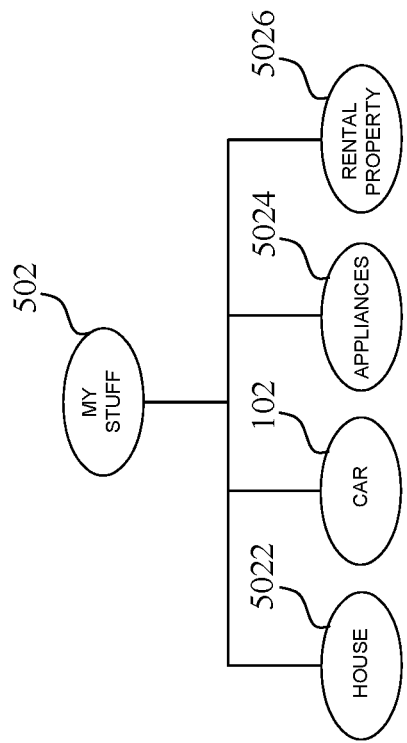
FIG. 5B illustrates an example twine in an example user digital econiche.

In example embodiments, the homepage constitutes a high hierarchical level twine comprising lower level twines with each lower level twine represented by one or more graphical symbol in the homepage. The homepage and following pages provide access to lower level categories and twines. By way of example, by clicking, pointing, or otherwise selecting graphical symbol of category "My Stuff" 502, user may be presented with recommendation page shown in FIG. 5B. FIG. 5B illustrates an example twine in an example user digital econiche. Depending on user's model, the recommendation page may include information regarding house 5022, car 102, appliances 5024, rental property 5026, etc. Again, user may accept, edit, modify, or discard the recommendation and build his own page in accordance with his needs and his mind associations. By way of example, by clicking, pointing, or otherwise selecting graphical symbol 102 user may open example template of twine 10 that is built around car 102 as a hub node. Again, user may edit or modify this twine.

Twine 10 is of collaborative type. User 100 manages nodes 102, 1022, 1024, 1028, and 1030. While buying a car, arranging financing, buying insurance, and communicating with DMV, user may provide the ID of car node 102 to the respective collaborating users and ask them to create or modify nodes that are personalized for the car node 102 of the respective user 100, and transfer the relating nodes into user's twine 10. By way of example, car dealer may be given permission to add VIN (vehicle identification number), car options, and other relevant information to the attributes of the car node 102. Similarly, bank may be given permission to create or to create and modify car loan node 1022, and car insurance company may create and modify node 1024. After nodes 1022 and 1024 are created, management rights over these nodes may be transferred to the user. Node 1020 may be managed by a car dealer and node 1026 by DMV.

Figure 1B:
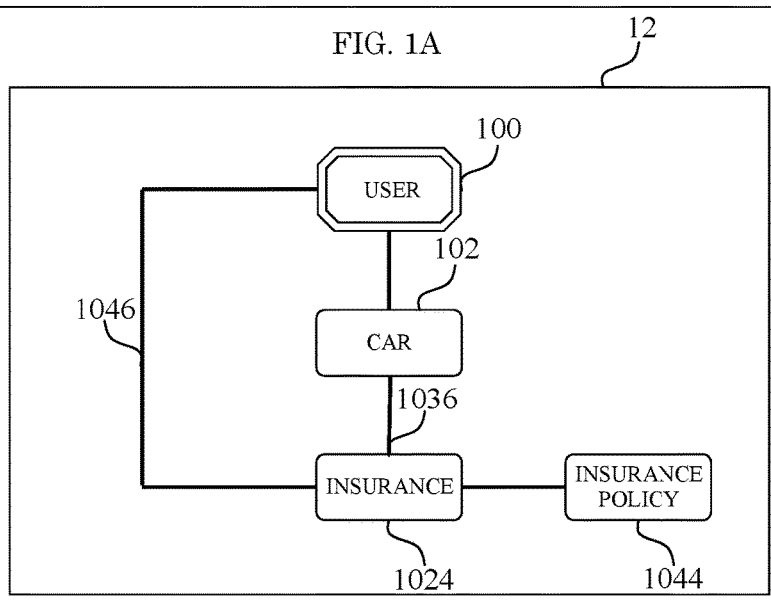
FIG. 1B illustrates an example structure and layout of an example interaction twine.

User node 100 contains a set of user's features or properties (an information model) tailored, adjusted, and adapted to user 100 interactions with a car dealer, a financing providing bank, an insurance company, and DMV. As an example, user model included in user node 100 may include user mailing address, phone, email address, list of cars owned by the user, and other suitable information. User may create more models representing the user in different relationships or interactions with other users or components of user econiche. Each model may be tailored (adapted) to a specific interaction or a type of interactions. For example, user may create a user node containing his mailing address, phone number, and email address to be used in a plurality of interactions. In addition, user may create another user node containing his personal information needed in his interactions with doctors as their patient. User may include one or more user models/nodes in a twine/hypernode related to a particular relationship or interaction with other users and components of user econiche. In alternative embodiments, user may include a plurality of attributes in his user model and allow other users to use not all of the attributes, but only those that user deems necessary for the respective relationship or interaction. Twine 10 is of associative type. It represents user associations related to acquiring a car and managing tasks of car ownership. Associative twines help user to navigate and traverse plurality of nodes and twines of the ecosystem information hypergraph. For example, user may need to change his car insurance policy. He may not remember how to access information needed to perform this task. To find it, user starts with his homepage shown in FIG. 5A and clicks, touches, or otherwise selects graphic symbol 502 "My Stuff". The interaction networking system 40 presents user with a twine shown in FIG. 5B. This twine is also of associative type. By selecting/clicking/touching symbol 102 user switches to twine 10 shown in FIG. 1A. This associative twine contains many nodes, sub twines, and edges that user does not need for the task at hand. To find nodes and edges needed to change the car insurance policy, user clicks symbol 1024 "Insurance" in the twine 10. In response, the interaction networking system 40 provides user with twine 12 shown in FIG. 1B. Nodes and edges in twine 12 contain the needed data. Twine 12 and similar twines containing all the information needed to perform a corresponding task are referred to herein as being of interaction type. Interaction twines may not contain information that user does not need for the corresponding interaction. If user wants to add a driver to his car insurance policy, he may change edge 1046 and include additional driver data in the relating attribute of the edge. If user sold his car and bought another one, he may change car make, model, year and other relevant information in the corresponding attribute of the node 102 "CAR". Change to a node, hypernode, twine, or edge causes a change to corresponding time stamp. Insurance company represented by node 1024 may register time stamp changes to edge 1046 and/or node 102 and use updated information to make corresponding changes to the insurance policy node 1044. It can be done manually by insurance agent, or by special application run by insurance company.

In particular embodiments, after the user interaction process 4402 generates visual or audio presentation (layout) of twines and nodes in step 616, it calls the twine management API 4406 for twines or node management API 4404 for nodes. In step 618, the twine management API 4406 assigns an ID to each twine and adds a name (label) given by the user. The API 4406 also adds structural document created by user interaction process 4402 in step 616 while working with user on the respective twine. The structural document defines data needed by client rendering engine to reproduce twine presentation (layout) on user's device. Similarly, in step 620, the node management API 4404 assigns ID and adds a label and respective structural document to each node. In some embodiments, node and twine structural documents may be added as attributes to the respective nodes and twines.

Nodes may change their state with time. Node management API 4404 generates a timestamp when a node is created and a new timestamp each time the node changes its status. By way of example, a doctor's patient may have access to a "Tests" node under doctor management that gets updated when a new test result is added. Node management API 4404 of interaction networking system 40 creates a new state node "Tests" and updates timestamp. It also assigns an attribute "current state" to the new state node and "non-current state" to previous state of "Tests" node.

In some embodiments, a twine may store, or be stored with a list of identifiers of nodes connected by the twine, and data that defines the specific properties of the connection. By way of example, twine information, in addition to twine ID, label and structural document, may include a plurality of additional attributes. Each twine may be of one of one or more twine types including intratwine, intertwine, and extratwine types, public or non-public type, and other suitable types.

Depending on the embodiment, twine types and some attributes may or may not be specified. When twine types and attributes are specified, the twine data may be stored in data store 42 together with data defining the details of the connected nodes relationship or interaction. In some embodiments, the data that is stored with the twine in the data store 42 may include twine ID, label, structural document, identifiers of the connected nodes, and not additional information specifying the details of relationship or interaction between the nodes. The latter may be stored within the nodes themselves.

After creation of twines presentation in step 616, twine management API 4406 communicates with user through user interaction process 4402 and adds attributes to twines in step 622. In step 624, node management API 4404 communicates with user through user interaction process 4402 and adds attributes to nodes. In step 626, after finishing creation of nodes and twines in user's digital econiche, node management API 4404 and twine management API 4406 store related user digital econiche information in the ecosystem hypergraph data store 4202. In alternative embodiments, some steps of the user digital econiche creation illustrated in FIG. 6A may follow in a different order.

In particular embodiments, when a user wants to use or modify information in his digital econiche, in step 630 the user interaction process 4202 receives request for an initial structural document for the respective user digital econiche of the respective user. In step 632, search process 4416 finds the document in the ecosystem information hypergraph data store 4202. While searching data store 4202, the search process 4416 may use IDs, ontological descriptors and searchable queries of nodes and twines. In step 634, user interaction process 4402 forwards the initial structured document (homepage) to the user. In step 636, the search process 4416 guides the user through navigation from the homepage to the needed twine or node, or finds required twine or node in the ecosystem information hypergraph data store 4202 directly. The user interaction process 4202 provides the user with access to attributes of the found nodes and twines in step 638. Servers 44 edit or modify node and twine attributes or create new node and twine attributes while communicating with the user through the user interaction process 4202, the twine management API 4406, and node management API 4404 in step 640. In step 642, twine and node management API's add timestamps and store changed twine and node information in ecosystem hypergraph data store 4202.

In particular embodiments, data stores 42 may include one or more searchable indexes generated by indexing process 4410. The indexes may be stored in ecosystem hypergraph data store 4202, in node and twine libraries 4204 or in one or more data stores outside stores 4202 and 4204. In some embodiments, indexing process 4410 generates and updates indexes periodically at predefined time intervals or every time there is a change in ecosystem hypergraph data store 4202, or node and twine libraries 4204. Indexing process 4410 generates various templates for the respective types and sub types of user digital econiches, nodes, twines, and sub twines using estimates based on users' group experience and intelligence. The templates are accessible by users in the process of creating and modifying respective user digital econiches, twines, and nodes. Indexing process 4410 may use text data mining software, like SAS Text Analytics, IBM Text Analytics, SAP Text Analytics, Smartlogic, and the like. Data mining software provides means for concept/entity extraction, automatic summarization and other suitable functions, to compare and categorize relating inputs from different users.

By way of example, indexing process may generate and update index of ecosystem entity types indexed by attributes and/or twines by which the respective nodes are connected with other nodes. For example, some users may include car node 102 in a twine 10 shown in FIG. 1A where car repairs and service are represented by two nodes Repairs 1028 and Service Record 1030. Yet other users may merge information regarding repairs and service in one node "Repairs Record". Some users may use another name/label for the same node, like "Record of Services and Repairs", etc. Information in the node 1028 "Repairs" and node 1030 "Service Record" may include a collection of bills per each repair or service. Different repair shops may give different names to similar bills. Data mining process, as a part of indexing process, crawls through ecosystem hypergraph data store, finds repair and service bills, analyzes them and extracts two concepts: "Repairs" and "Service". Indexing process 4410 calculates how often these concepts appear separately as dedicated nodes 1028 and 1030, or together, either as combined service and repairs node, or as attributes of the car node 102. Indexing process 4410 may generate popularity quotient for each configuration. For example, let's assume that configuration with nodes 1028 and 1030 appeared in 40% of users, nodes 1028 and 1030 were merged in one node by 30% of users, 20% of users placed Repairs and Service concepts in node 102 attributes, and 10% used other configurations. Indexing process 4410 creates three templates representing 40%, 30%, and 20% users respectfully. These templates are stored in a data store 4204. When a user creates or modifies his digital econiche, user interaction process 4402 presents the user with these templates. User may choose one of them or build his own car node and relating twine. FIG. 1A represents an example node/twine configuration where user chose two dedicated nodes 1028 and 1030. In a similar way, indexing process 4410 may create templates for attributes of node 102 and any other node. For example, template for node 102, in addition to Repairs and Service attributes, may also include Make, Model, Year, Options, Mileage, and other attributes. By way of another example, indexing process 4410 may generate and update index of user types, sub types and models indexed by twine labels belonging to the initial highest hierarchy level. For example, indexing process 4410 may index a type of users corresponding to an individual by labels 502, 504, 506, 508, 510, 512, 514, and 516 shown in FIG. 5A. Indexing process 4410 may generate popularity quotient for each label and each set of labels, each set of labels being constructed from labels included in the index. For example, if label 502 appears 300 times per 1000 users, its popularity quotient is 0.3. If set of labels 502, 504, and 508 appears 200 times per 1000 users, the popularity quotient for this set is 0.2. Indexing process 4410 stores labels, sets of labels, and their respective popularity quotients in node and twine libraries 4204. When user provides user's general model to the server 44 in step 610, indexing process 4410 (or, in alternative embodiments, search process 4416) finds labels and set of labels corresponding to user's general model with popularity quotient exceeding predefined level. User interaction process 4402 then transmits these labels and label sets to a respective user as templates in step 612. In addition to hypergraph data store, indexing process 4410 may crawl external sources like World Wide Web and others in search for relevant information. If user pool is not big enough to generate statistical estimates, the interaction networking system 40 provides users with templates designed by experts.

In addition to templates generated by interaction networking system 40, the templates can also be open sourced, provided by third parties, or by other users. User may have an option to instruct search process 4416 to find these templates. In addition, sellers may provide buyers with templates that support their product. For example, when user buys a car, per user's request, car dealer may send to the user a related template 10 shown in FIG. 1A.

Collaborative activities require users to share their management rights or transfer management rights over nodes and twines to other users. By way of example, if a car owner sells a car to another user, the sale may include a condition that the seller transfers management rights over some nodes and twines shown in FIG. 1A to the buyer. Management rights enforcement process 4408 of the interaction networking system 40 provides users with means to execute management rights transfers, support transfer conditions, and enforce user management rights.

User as a manager may allow other collaborating users to access a node or a twine, or access and modify them. In particular embodiments, user may include a list of other users that are granted access to a node or a twine as an attribute to the respective node or twine. The list may include specific rights granted to each respective user and conditions to be met by respective user to acquire granted rights. When a user requests access to a node or a twine in the data store 42, user interaction process 4402 calls management rights enforcement process 4408 to check user's eligibility. If a user is the manager of the requested node or twine, management rights enforcement process 4408 allows user to access respective node or twine, edit or modify it, or transfer user's management rights to another user. If a user requests access to a node or a twine managed by another user, management rights enforcement process 4408 checks whether requesting user has been granted management rights to access or access and modify the node or the twine, and whether conditions of the management rights transfer are met. By way of example, user as a car owner in FIG. 1A may allow dealer or another car repair shop to access, or to access and add a bill to car repairs node 1028 only on a day of repairs. At other time, management enforcement process 4408 will reject dealer's attempt to access node 1028. User may share management rights with public or another user for unspecified time interval, but stop sharing in the future, if needed. Collaborating users may schedule management rights transfer on a predefined date and predefined condition. By way of example, a team working on a software project may be required to deliver several code modules to another team. The management rights enforcement process 4408 may check whether all required modules were transferred on schedule, inform the receiving team, and allow access to the modules.

In particular embodiments, interaction networking system 40 provides users with Platform as a Service (PaaS) to build and run various software applications. This platform includes application engine 4412 and application context service 4418. Application engine 4412 may virtualize applications across multiple servers 44. In some embodiments, application engine 4412 may comprise a plurality of scalable Virtual Machines (VM) deployed over multiple servers 44, as well as supporting services for communication with ecosystem information hypergraph data store 4202 through user interaction process 4402. Applications build by user or acquired from other users are stored as nodes or twines in the ecosystem hypergraph data store 4202.

FIG. 7A illustrates an example data flow in an example application invocation in an example interaction network. In particular embodiments, when user at user client 20 makes a request to run an application, the user interaction process 4402 retrieves application code stored as a data object in ecosystem hypergraph data store 4202 and passes it to application engine 4412 for execution. In the course of application execution, application engine 4412 may invoke application context service 4418 to establish an application context. Application context may be a set of interaction network nodes and twines that one or more users served by application allow the application engine to retrieve from ecosystem hypergraph data store 4202 in order to process data related and specific to the respective users. By way of example, user may allow Restaurant Takeout Application to have access to his personal data objects—phone and address—and use these data as user context at application execution. User application context settings for the individual applications or application classes, types, or sub types may be stored in the ecosystem information hypergraph data store 4402, node and twine libraries 4204, or another storage in the data store 42. In some embodiments, while creating or editing application node, user may add attributes that list nodes and twines needed to execute the application, including user context data. Application context service 4418 retrieves required data from data store 42 and invokes management rights enforcement process 4408 to check if the user that requested application execution has permission to access user specific context of other users affected by application. By way of example, when a restaurant sends a request to execute Restaurant Takeout Application, application context service 4418 checks with management rights enforcement process 4408 whether user serviced by the application gave permission to access his related context. By way of another example, users may employ a Scheduler Application to schedule a meeting of busy participants. The participants may allow Scheduler Application to access their calendars, choose a few options of a time when all participants are available for the meeting, inform participants, get their feedback, and determine an option that is acceptable to everybody.

In particular embodiments, at execution run time, application engine 4412 may communicate with node management API 4404 and twine management API 4406 if the application outcome requires creation, deletion, or modification of nodes and twines. Application execution generates data that flow from application engine 4412 to user client 20 through user interaction process 4402 as shown in FIG. 7B.

In the present disclosure, ecosystem hypergraph data store 4202 may store sensitive data like user medical history, credit card payments, company proprietary information, and the like. The data store 4202 and interaction networking system 40 as a whole have to meet various security compliance requirements like Health Insurance Portability and Accountability Act (HIPAA), Payment Card Industry Data Security Standard (PCI DSS), Gramm-Leach-Bliley Act (GLBA), Sarbanes-Oxley (SOX) Act, and European Union Data Protection Directive (EUDPD). Encryption process 4414 interacts with user interaction process 4402, node management API 4404, twine management API 4406, and data store 42 and may provide one or more of various encryption types and protocols. By way of example, encryption process 4414 may support transport-level encryption per Internet Engineering Task Force (IETF) standard RFC 6176; cell, file, and folder level encryption; cloud data, cloud storage, and cloud computing encryption, and other encryption options if required. In some embodiments, third party encryption may be used.

The present disclosure encompasses all changes, substitutions, variations, and modifications to the example embodiments herein that a person having ordinary skill in the art would comprehend.

The invention claimed is:

1. A system comprising:
one or more computing systems and one or more hypergraph data stores that are accessed by the one or more computing systems; the one or more hypergraph data stores storing an information hypergraph comprising a plurality of users and a plurality of user digital econiches that each is owned by a respective user, wherein:
at least one user digital econiche from the plurality of user digital econiches comprises a respective user digital econiche hypergraph including:
a plurality of nodes that each corresponds to a respective ecosystem component from a respective user digital econiche, the plurality of nodes including:
a first set of user nodes, wherein each user node of the first set of user nodes corresponds to a respective user digital econiche owner or a user interacting with the owner,
a second set of ecosystem entity nodes, wherein each ecosystem entity node of the second set of ecosystem entity nodes is capable of being engaged in interactions initiated or authorized by one or more users that each is represented by a node from the first set of user nodes, and
a third set of interaction agent nodes, wherein each interaction agent node of the third set of interaction agent nodes corresponds to a respective proxy software agent executing interactions or creating nodes under authorization of one or more users that each is represented by a node from the first set of user nodes; and
a plurality of hyperedges, each hyperedge of the plurality of hyperedges defining a connection between nodes from the plurality of nodes or between other hyperedges from the plurality of hyperedges, the plurality of hyperedges including:
a first set of hyperedges that each connects nodes from the plurality of the user digital econiche hypergraph nodes, wherein at least one hyperedge from the first set of hyperedges directly connects more than two nodes, and
a second set of hyperedges that each connects two or more hyperedges from at least one of the first and the second set of hyperedges;
the one or more computing systems provide a user with a managerial status over one or more of at least one of nodes and hyperedges, the said managerial status including:
a first managerial privilege to acquire a set of access privileges including privileges to create nodes and hyperedges and to view., alter, or delete one or more of at least one of created nodes, hyperedges, and their attributes, a second managerial privilege to transfer and relinquish a whole or a subset of the user managerial status over the one or more of at least one of nodes and hyperedges under user management to one or more other users for a specified or unspecified length of time and under specified or unspecified conditions, and a third managerial privilege to share one or more access privileges from the first managerial privilege over the one or more of at least one of nodes, hyperedges, and their attributes with one or more other users for a specified or unspecified length of time and under specified or unspecified conditions; and at least one user digital econiche hypergraph comprises one or more of at least one of collaborative nodes and collaborative hyperedges, wherein one or more users with managerial status over the one or more of at least one of collaborative nodes and collaborative hyperedges share their right to view or view and alter the one or more of at least one of nodes and hyperedges with one or more other users.

2. The system of claim 1, wherein the one or more computing systems store in the one or more hypergraph data stores a library of at least one of node and hyperedge templates for the respective types of user digital econiches, nodes and hyperedges, the templates being accessible by users in a process of creating and modifying respective user digital econiches, nodes and hyperedges.

3. The system of claim 1, wherein at least one hyperedge comprises a collection of one or more attributes, the collection of the attributes defining one or more interactions or relationships involving the respective hyperedge.

4. The system of claim 1, wherein at least one hyperedge in at least one user digital econiche hypergraph comprises one or more user nodes corresponding to users who each own a user digital econiche different from the one the said hyperedge belongs to and at least one of additional nodes and hyperedges with a whole or a subset of managerial status over them being granted to at least one of the said users.

5. The system of claim 1, wherein the one or more computing systems are operable to access program logic storage storing at least one of a node and hyperedge indexing program logic which, when executed by the one or more computing systems, calculates popularity rating of at least one of the nodes and hyperedges and generates respective templates for nodes and hyperedges.

6. The system of claim 1, wherein the one or more computing systems are operable to access program logic storage storing a search program logic which, when executed by the one or more computing systems, enables each user to navigate from the homepage to a needed node or a hyperedge, or to execute a query search.

7. A method comprising:

providing one or more computing systems and one or more hypergraph data stores that are accessed by the one or more computing systems and maintaining the one or more hypergraph data stores storing an information hypergraph comprising a plurality of users and a plurality of user digital econiches that each is owned by a respective user, wherein:

at least one user digital econiche from the plurality of user digital econiches comprises a respective user digital econiche hypergraph including:

a plurality of nodes that each corresponds to a respective ecosystem component from a respective user digital econiche, the plurality of nodes including:

a first set of user nodes, wherein each user node of the first set of user nodes corresponds to a respective user digital econiche owner or a user interacting with the owner, a second set of ecosystem entity nodes, wherein each ecosystem entity node of the second set of ecosystem entity nodes is capable of being engaged in interactions initiated or authorized by one or more users that each is represented by a node from the first set of user nodes, and a third set of interaction agent nodes, wherein each interaction agent node of the third set of interaction agent nodes corresponds to a respective proxy software agent executing interactions or creating nodes under authorization of one or more users that each is represented by a node from the first set of user nodes; and a plurality of hyperedges, each hyperedge of the plurality of hyperedges defining a connection between nodes from the plurality of nodes or between other hyperedges from the plurality of hyperedges, the plurality of hyperedges including:

a first set of hyperedges that each connects nodes from the plurality of the user digital econiche hypergraph nodes, wherein at least one hyperedge from the first set of hyperedges directly connects more than two nodes, and a second set of hyperedges that each connects two or more hyperedges from at least one of the first and the second set of hyperedges;

the one or more computing systems provide a user with a managerial status over one or more of at least one of nodes and hyperedges, the said managerial status including:

a first managerial privilege to acquire a set of access privileges including privileges to create nodes and hyperedges and to view, alter, or delete one or more of at least one of created nodes, hyperedges, and their attributes, a second managerial privilege to transfer and relinquish a whole or a subset of the user managerial status over the one or more of at least one of nodes and hyperedges under user management to one or more other users for a specified or unspecified length of time and under specified or unspecified conditions, and a third managerial privilege to share one or more access privileges from the first managerial privilege over the one or more of at least one of nodes, hyperedges, and their attributes with one or more other users for a specified or unspecified length of time and under specified or unspecified conditions; and at least one user digital econiche hypergraph comprises one or more of at least one of collaborative nodes and collaborative hyperedges, wherein one or more users with managerial status over the one or more of at least one of collaborative nodes and collaborative hyperedges share their right to view or view and alter the one or more of at least one of nodes and hyperedges with one or more other users.

8. The method of claim 7, wherein the one or more computing systems store in the one or more hypergraph data stores a library of at least one of node and hyperedge templates for the respective types of user digital econiches, nodes and hyperedges, the templates being accessible by users in a process of creating and modifying respective user digital econiches, nodes and hyperedges.

9. The method of claim 7, wherein at least one hyperedge comprises a collection of one or more attributes, the collection of the attributes defining one or more interactions or relationships involving the respective hyperedge.

10. The method of claim 7, wherein at least one hyperedge in at least one user digital econiche hypergraph comprises one or more user nodes corresponding to users who each own a user digital econiche different from the one the said hyperedge belongs to and at least one of additional nodes and hyperedges with a whole or a subset of managerial status over them being granted to at least one of the said users.

11. The method of claim 7, wherein the one or more computing systems are operable to access program logic storage storing at least one of a node and hyperedge indexing program logic which, when executed by the one or more computing systems, calculates popularity rating of at least one of nodes and hyperedges and generates respective templates for nodes and hyperedges.

12. The method of claim 7, wherein the one or more computing systems are operable to access program logic storage storing a search program logic which, when executed by the one or more computing systems, enables each user to navigate from homepage to a needed node or a hyperedge, or to execute a query search.

* * * * *